(12) United States Patent  
Yamamoto

(10) Patent No.: US 6,603,673 B2
(45) Date of Patent: Aug. 5, 2003

(54) CHARGE-PUMP CIRCUIT AND A LOAD-DRIVING CIRCUIT UTILIZING THE SAME

(75) Inventor: Tomohisa Yamamoto, Hoi-gun (JP)

(73) Assignee: Denso Corporation, Kariya (JP)

( * ) Notice: Subject to any disclaimer, the term of this patent is extended or adjusted under 35 U.S.C. 154(b) by 16 days.

(21) Appl. No.: 10/038,289

(22) Filed: Nov. 9, 2001

(65) Prior Publication Data
US 2002/0145893 A1 Oct. 10, 2002

(30) Foreign Application Priority Data
Nov. 10, 2000 (JP) ........................................ 2000-343858

(51) Int. Cl.[7] .......................... H02M 3/18; H03K 7/162
(52) U.S. Cl. ......................... 363/60; 363/288; 363/299; 327/589; 307/110
(58) Field of Search ...................... 363/59, 60, 124; 323/284, 288, 299; 327/536, 589; 307/110

(56) References Cited

U.S. PATENT DOCUMENTS 5,392,205 A * 2/1995 Zavaleta ...................... 363/59
5,729,172 A * 3/1998 Tsukada ..................... 363/59 X
6,049,201 A * 4/2000 Feldtkeller .................. 323/288

FOREIGN PATENT DOCUMENTS

JP 4-127307 4/1992
JP 10-290150 10/1998

* cited by examiner

Primary Examiner—Jessica Han
(74) Attorney, Agent, or Firm—Harness, Dickey & Pierce, PLC

(57) ABSTRACT

The present invention discloses a charge-pump circuit, which contributes to the improvement of the reliability of capacitor for boosting provided inside even under the condition where supply voltage is changed, and which also contributes to the reduction of consumption current. In this charge-pump circuit, a constant voltage generation circuit generates a reference voltage VS lower by a fixed voltage VT than a supply voltage VB of a power source +B and gives the reference voltage to a booster circuit. The booster circuit comprises an inverter circuit for alternately changing output voltage between the supply voltage VB and the reference voltage VS in response to reverse operation in synchronization with the output of an oscillation circuit, and also an inverter circuit for alternately changing output voltage between the reference voltage VS and the supply voltage VB in response to periodic reverse operation with a phase by 180° different from the phase of said inverter, whereby charging current is supplied via a diode to a first capacitor from the power source +B during the period when output of the inverter circuit is changed to the reference voltage VS, and electric charge charged on the first capacitor is shifted to the second capacitor via the diode during the period when output of the inverter circuit is changed to the reference voltage VS.

8 Claims, 11 Drawing Sheets

CHARGE-PUMP CIRCUIT AND A LOAD-DRIVING CIRCUIT UTILIZING THE SAME

BACKGROUND OF THE INVENTION

1. Field of the Invention

The present invention relates to a charge-pump or charge pumping circuit for boosting supply voltage by means of capacitors, and the invention also relates to a load-driving or load drive circuit utilizing the same.

2. Related Art

FIG. 18 is a schematical block diagram of a load drive circuit using a charge pumping circuit. In FIG. 18, the load drive circuit is provided with an N channel type MOS transistor 2, which has advantageous features such as low ON resistance for on-off control of a load 1. Specifically, an MOS transistor 2 is used as a high side switch, which has its drain connected to a power source +B and to a ground terminal via the load 1. In this case, to maintain the MOS transistor 2 in the turned-on condition, a gate control voltage must be set to a level higher than a supply voltage VB. For this reason, the gate control voltage is obtained by a booster circuit 3 with power supplied from the power source +B. Together with an oscillation circuit 4 with power supplied from the power source +B, the booster circuit makes up a charge pumping circuit 5. A concrete example of this charge pumping circuit 5 is given in FIG. 17.

As shown in FIG. 17, a booster circuit 3 comprises a power terminal Qin connected to a power source +B, a signal input terminal Qosc connected to output terminal of an oscillation circuit 4, an output terminal Qout connected to gate of an MOS transistor 2, and an earth terminal GND connected to a ground terminal. Also, the booster circuit 3 comprises inverter circuits 6, 7 and 8 connected between the power terminal Qin and the earth terminal GND, reverse-blocking diodes 9, 10 and 11 connected in forward direction and in series between the power terminal Qin and the output terminal Qout, a first capacitor 12 connected between cathode of the diode 9 and the output terminal of the inverter circuit 6, and a second capacitor 13 connected between cathode of the diode 10 and the output terminal of the inverter circuit 8. In this case, each of the inverter circuits 6 and 7 has its input terminal connected to the signal input terminal Qosc, and the output terminal of the inverter circuit 7 is connected to the input terminal of the inverter circuit 8.

In the charge pumping circuit 5 with the above arrangement, output of the inverter circuit 6 is alternately reversed between output voltage level (=VB) of the power source +B and the ground potential level in synchronization with oscillation output from the oscillation circuit 4. Also, output of the inverter circuit 8 has a phase by 180° different from the phase of the output of the inverter circuit 6. During the period when output voltage of the inverter circuit 6 is turned to the ground potential level, electric power is charged to the first capacitor 12 from the power source +B via the diode 9. Thereafter, during the period when output voltage of the inverter circuit 6 is turned to the supply voltage VB and output voltage of the inverter circuit 8 is turned to the ground potential level, electric charge charged on the first capacitor 12 is shifted to the second capacitor 13 via the diode 10 and this operation is repeated. By this charge pumping operation, a voltage boosted to higher level than the supply voltage VB is outputted from the output terminal Qout.

In the conventional type circuit configuration as described above, a voltage corresponding to a difference between the supply voltage VB and the ground potential level (actually, a voltage lower by the voltage drop in forward direction of the diode 9) is applied on the first capacitor 12, and a voltage of about twice as high as the supply voltage VB is applied on the second capacitor 13. As a result, when fluctuation of the supply voltage VB inevitably occurs such as the case where the power source +B is a battery used on board of a vehicle, the voltage applied on the capacitors 12 and 13 is increased when the supply voltage VB is increased, and this adversely affects service life of the capacitors 12 and 13.

Further, in the conventional case as described above, output current of the booster circuit 3 is increased proportionally to the increase of the supply voltage VB. When it is tried to obtain an ability to meet the specification required on the output current, this requirement must be satisfied also under the condition where the supply voltage VB is decreased to the lowest operating voltage. For this reason, when the supply voltage VB is at normal level, the circuit inevitably consumes output current uselessly, and it is difficult to decrease this consumption of electric current.

SUMMARY OF THE INVENTION

To solve the above problems, it is an object of the present invention to provide a charge pumping circuit, by which it is possible to improve reliability on service life of capacitors for boosting provided in the circuit even under condition where the supply voltage fluctuates, and also it is possible to reduce the consumption current. The invention also provides a load drive circuit using the charge pumping circuit.

To attain the above object, the charge pumping circuit according to the present invention comprises a first capacitor to be charged intermittently from a power source and a second capacitor, to which electric charge charged on the first capacitor is shifted via reverse-blocking means for the purpose of boosting the supply voltage. There is provided a constant voltage generation circuit for generating a reference voltage maintained on a level lower by a fixed voltage than the supply voltage under normal condition, and charging operation to the first capacitor and the second capacitor is performed with the reference voltage as reference. By the arrangement as described above, when the supply voltage is increased, the reference voltage is also increased in response to it, and the relationship between the supply voltage and the reference voltage is maintained always at a constant level. As a result, the maximum value of the voltage applied on the first capacitor and the second capacitor is fixed on a certain fixed level. Specifically, the voltage applied on the first and the second capacitors is not increased in association with the increase of the supply voltage as in the conventional type system. Therefore, there is no adverse effect on service life of the first capacitor and the second capacitor, and this contributes to the improvement of reliability on the service life of the capacitors. Further, the booster circuit is operated between the supply voltage and the reference voltage, which is lower by a certain fixed voltage value than the supply voltage. As a result, operating condition of the booster circuit is maintained at a constant level regardless of the fluctuation of the supply voltage. For this reason, if it is determined in such manner that boosting ability of the booster circuit is in stabilized state to maintain a constant relationship between the reference voltage and the supply voltage, useless output current does not flow even when the supply voltage is increased, and this contributes to the reduction of consumption current.

According to a preferred aspect of the present invention, the reference voltage is outputted from a current amplifier circuit of high input impedance, and the reference voltage is very unlikely to be changed even when load current is changed. As a result, it is possible to prevent undesirable condition where maximum value of the voltage applied on the first capacitor and the second capacitor is unexpectedly changed.

According to another preferred aspect of the present invention, the current amplifier circuit comprises a voltage follower using an operational amplifier. As a result, stable operation with very few errors can be expected.

According to still another preferred aspect of the present invention, the current amplifier circuit comprises a Darlington transistor circuit. This contributes to simplification of the circuit design compared with the case where the voltage follower is used.

According to yet still another preferred aspect of the present invention, each of the first capacitor and the second capacitor comprises a plurality of unit capacitors connected in series. As a result, even when short-circuiting failure may occur in one of the unit capacitors, which make up the first and the second capacitors, boosting function by the first capacitor and the second capacitor can be maintained, and this contributes to the improvement of operation reliability.

According to still another preferred aspect of the present invention, each time the output voltage of the first switching circuit is changed to the reference voltage, charging current is supplied from the power source to the first capacitor via a first rectifying device. During the period when output voltage of the first switching circuit is changed to the reference voltage, electric charge charged on the first capacitor is shifted to the second capacitor via a second rectifying device in response to the change of the output voltage of the second switching circuit to the reference voltage. As a result, boosting operation of the supply voltage is carried out.

According to still another preferred aspect of the present invention, the first switching circuit and the second switching circuit are provided by inverter circuits, which comprise diverse circuit configuration, and this contributes to the improvement of the degree of freedom in circuit design.

In the load drive circuit according to the present invention, the charge pumping circuit with the above characteristics is used, and the load is driven by on-off control of an N channel MOS transistor, which has advantageous features such as low ON resistance. This makes it possible to supply high load current and to improve the reliability on service life.

BRIEF DESCRIPTION OF THE DRAWINGS

The object and the features of the present invention will become more apparent from the description on the embodiments of the invention, which will be given below in connection with the drawings.

DETAILED DESCRIPTION OF THE PREFERRED EMBODIMENTS (1st Embodiment)

Description will be given below on a first embodiment of the present invention referring to FIG. 1 to FIG. 5.

Figure 2:
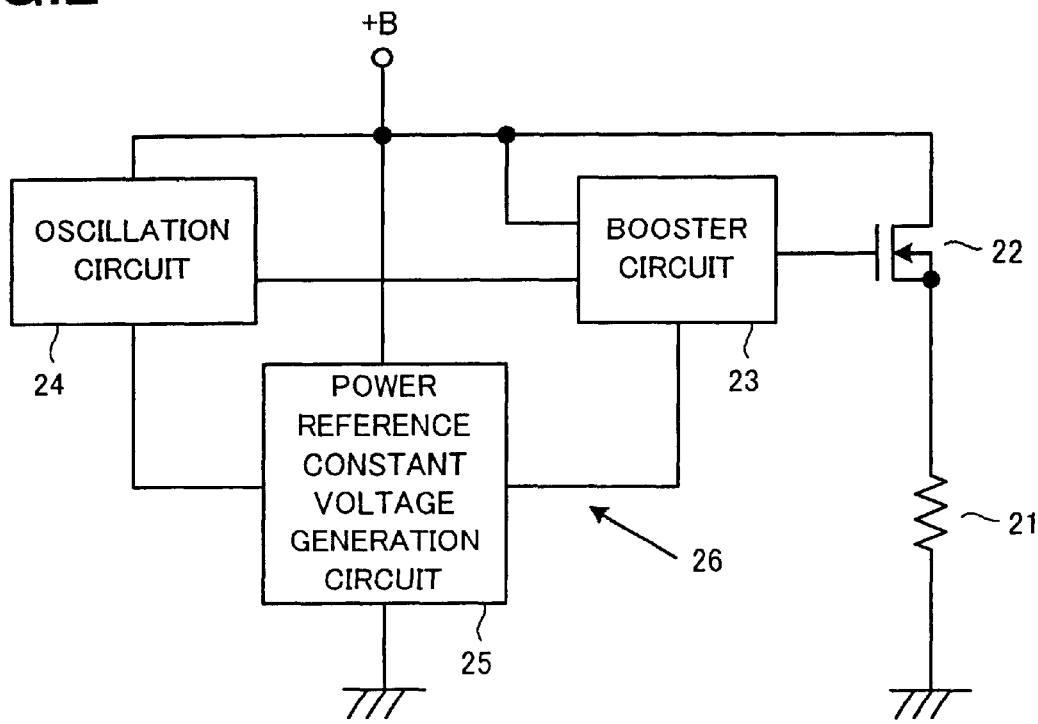
FIG. 2 is a schematical block diagram of a load drive circuit using the charge pumping circuit of the present invention.

FIG. 2 shows a schematical circuit configuration of a load drive circuit using a charge pumping circuit. In FIG. 2, the load drive circuit is provided with an N channel type MOS transistor, which has advantageous features such as low ON resistance for on-off control of a load 21. The MOS transistor 22 is designed as a high-side switch, which has its drain connected to a power source +B and its source connected to a ground terminal via the load 21. Together with an oscillation circuit 24 and a power source reference constant voltage generation circuit (constant voltage generation circuit) 25, a booster circuit 23 for applying gate control voltage to the MOS transistor 22 constitute a charge pumping circuit 26. To the circuits 23, 24 and 25, power is supplied from the power source +B. The charge pumping circuit 26 is designed as a one-chip IC.

Figure 1:
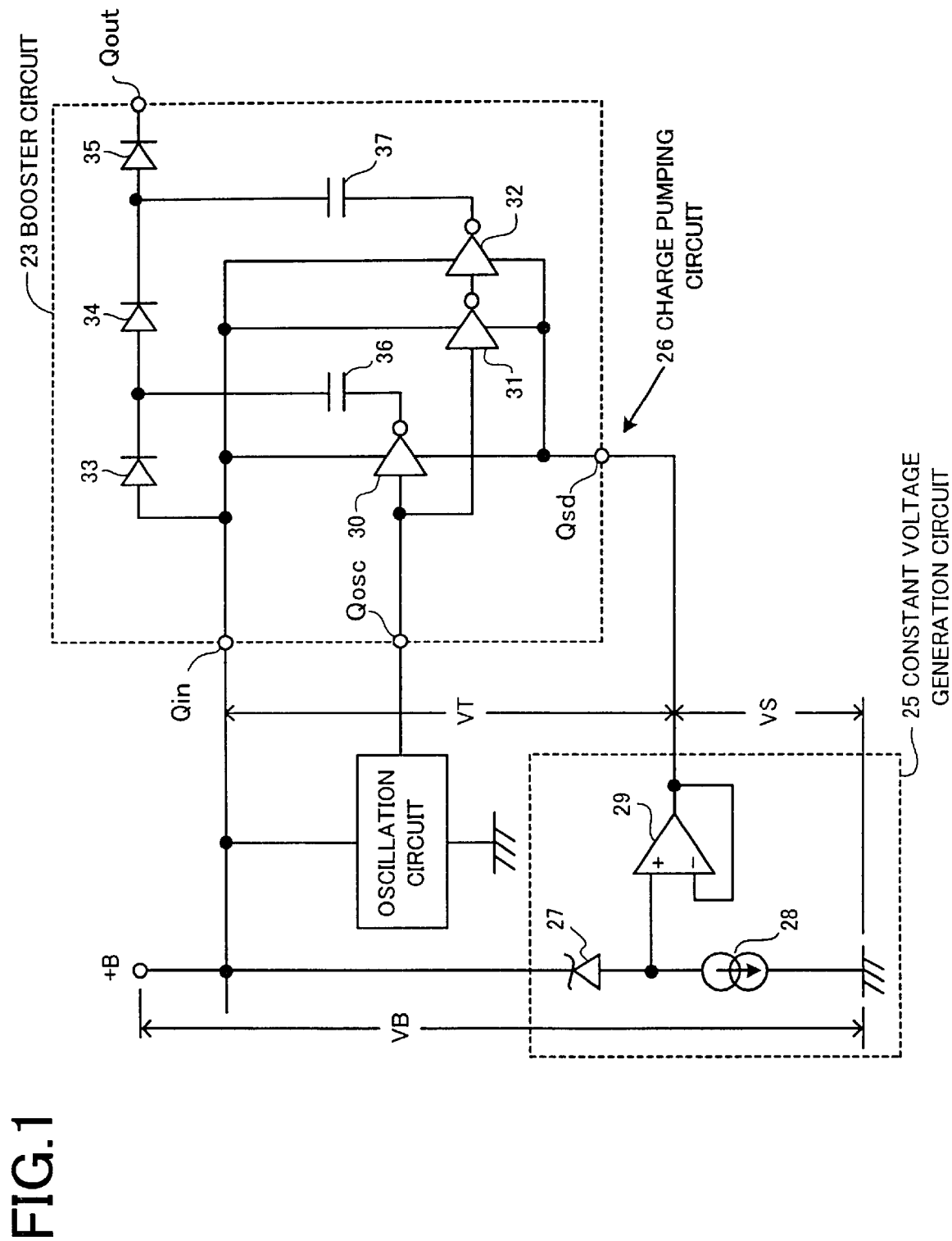
FIG. 1 is a block diagram of a charge pumping circuit of a first embodiment of the present invention.

FIG. 1 shows a concrete example of circuit configuration of the charge pumping circuit 26. In FIG. 1, the power reference constant voltage generation circuit 25 is a combination of a Zener diode 27, a constant current circuit 28, and a voltage follower 29 using an operational amplifier (corresponding to a current amplifier circuit in the present invention). The Zener diode 27 has its cathode connected to the power source +B and its anode connected to a ground terminal via the constant current circuit 28. Therefore, when power is turned on, a reference voltage VS appears on anode side (on the constant current circuit 28) of the Zener diode 27, and the reference voltage is maintained at a level lower by a fixed voltage VT (corresponding to Zener voltage of the Zener diode 27) than the output voltage VB of the power source +B under normal condition. This reference voltage VS is applied to a reference voltage terminal Qsd of the booster circuit 23 via the voltage follower 29.

The booster circuit 23 comprises, in addition to the reference voltage terminal Qsd, a power terminal Qin connected to the power source +B, a signal input terminal Qosc connected to an output terminal of the oscillation circuit 24, and an output terminal Qout connected to the gate of the MOS transistor 22. Also, the booster circuit 23 comprises inverter circuits 30, 31 and 32 with power supplied via the power terminal Qin and the reference voltage terminal Qsd, diodes 33, 34 and 35 connected in series and in forward direction between the power terminal Qin and the output terminal Qout, a first capacitor 36 connected between the cathode of the diode 33 and the output terminal of the inverter circuit 30, and a second capacitor 37 connected between the cathode of the diode 34 and the output terminal of the inverter circuit 32.

In this case, each of the inverter circuits 30 and 31 has its input terminal connected to the signal input terminal Qosc, and the output terminal of the inverter circuit 31 is connected to the input terminal of the inverter circuit 32. Therefore, the inverter circuit 32 generates an output voltage with its phase by 180° different (anti-phase) from the phase of the inverter circuit 30. Here, the inverter circuits 30 and 32 correspond to a first switching circuit and a second switching circuit respectively. The diodes 33 and 34 correspond respectively to a first rectifying device and a second rectifying device (reverse-blocking means) as these are called in the present invention.

Figure 3:
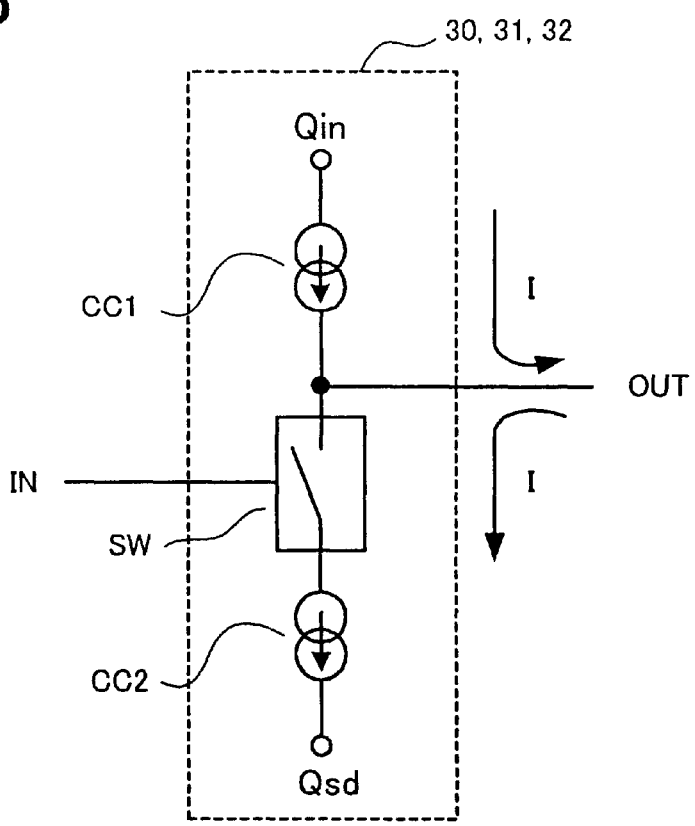
FIG. 3 is an equivalent circuit diagram of an inverter circuit shown in FIG. 1.

FIG. 3 shows examples of configuration of the inverter circuits 30–32 used in the present embodiment, showing in equivalent circuit. In FIG. 3, the inverter circuits 30–32 are provided with a switching element SW, which is turned on when the input terminal IN is at "H" level and it is turned off when the input terminal IN is at "L" level. When the switching element SW is turned off (when an "L" level signal is inputted), a constant current I is supplied from the power terminal Qin to the output terminal OUT via a constant current source CC1. When the switching element SW is turned on (i.e. when an "H" level signal is inputted), a constant current I is supplied from the output terminal OUT to the reference voltage terminal Qsd via the switching element SW and a constant current source CC2.

Figure 4:
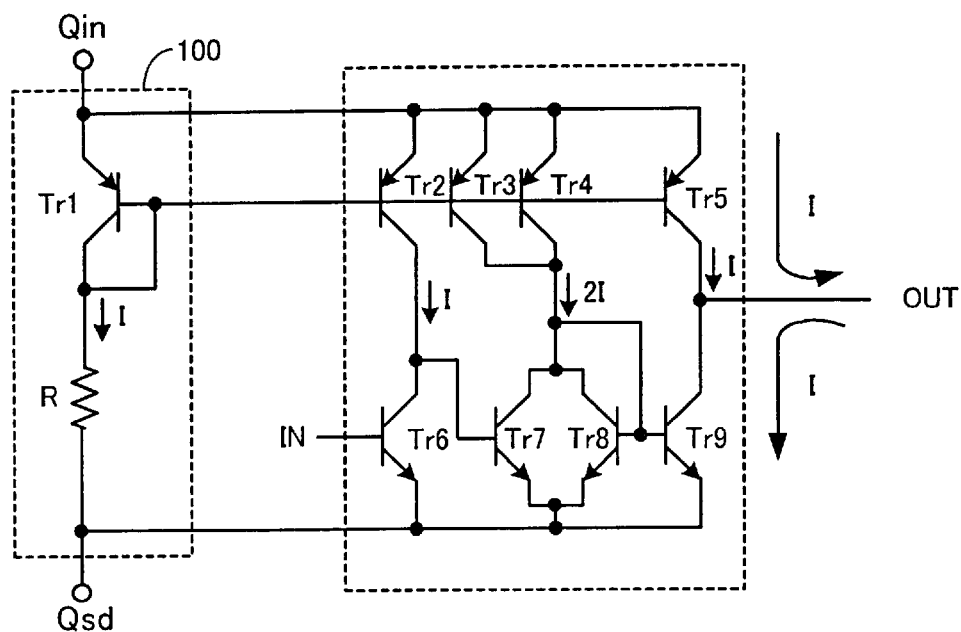
FIG. 4 is a more concrete circuit diagram of the inverter circuit.

FIG. 4 shows a concrete example of a circuit, which makes up the equivalent circuit of FIG. 3 by means of bipolar transistor. In FIG. 4, a constant current circuit 100 of known type, which combines a pnp type transistor Tr1 and a resistance R, is connected between the power terminal Qin and the reference voltage terminal Qsd. Each of pnp type transistors Tr2–Tr5 has its base connected to a base of the transistor Tr1 and its emitter connected to the emitter of the transistor Tr1. This constitutes a current mirror circuit to the transistor Tr1. The collector of the transistor Tr2 is connected to the reference voltage terminal Qsd via collector-emitter of an npn type transistor Tr6, and it is connected to the base of an npn type transistor Tr7. The base of the transistor Tr6 is connected to the input terminal IN. Each of the transistors Tr3 and Tr4 has its collector connected in common, and the collectors are connected in parallel to the reference voltage terminal Qsd between collector-emitter of the transistor Tr7 and collect-emitter of an npn type transistor Tr8. The collector of the transistor Tr5 is connected to the output terminal OUT and is connected to the reference voltage terminal Qsd via collector-emitter of an npn type transistor Tr9. In this case, the transistors Tr8 and Tr9 have the bases connected with each other, and the bases are connected to the collector of the transistor Tr8. As a result, these components make up a current mirror circuit.

In the inverter circuits 30–32 with the above arrangement, the constant current I is supplied to the constant current circuit 100 when power is turned on, and a current I of the same level is supplied to each of the transistors Tr2–Tr5 (base current is neglected). When an "L" level signal is inputted to the input terminal IN, the transistor Tr6 is turned off. In response to this, the transistor Tr7 is turned on and the transistors Tr8 and Tr9 are turned off. Then, the current I flowing in the transistor Tr5 flows out from the output terminal OUT. In contrast, when an "H" level signal is inputted to the input terminal IN, the transistor Tr6 is turned on. In response to this, the transistor Tr7 is turned off, and the transistors Tr8 and Tr9 are turned on. In this case, a total sum of the current (=2I) of the current I flowing in the transistors Tr3 and Tr4 respectively is supplied to the transistor Tr8. Also, the current 2I is supplied to the transistor Tr9, which makes up the current mirror circuit together with the transistor Tr8. Therefore, the current ΔI flowing via the output terminal OUT in this case is given by:

$$\Delta I = I - 2I = -I$$

As in this case, when the current ΔI flowing via the output terminal OUT has a minus sign, it means that the current is supplied from the output terminal OUT to the reference voltage Qsd via the transistor Tr9, and the level of the supplied electric current is I.

The inverter circuit has a constant current circuit related to outflow and inflow of electric current as described above, and it has such advantage that generation of radio noise can be reduced.

In the charge pumping circuit 26 with the above arrangement, the output of the inverter circuit 30 is alternately reversed between "H" level (supply voltage VB) and "L" level (reference voltage VS=VB−VT) in synchronization with oscillation output from the oscillation circuit 24. The output of the inverter circuit 32 has a phase by 180° different from the phase of the output of the inverter circuit 30. In this case, during the period when the output of the oscillation circuit 24 is at "L" level immediately after the power source +B is turned on, the output of the inverter circuit 30 is at "H" level (=VB) and the output of the inverter circuit 32 is at "L" level (=VS). Here, if it is supposed that voltage drop in forward direction of the diode is Vf, high potential side of the first capacitor 36 has a voltage level of VB−Vf, and high potential side of the second capacitor 37 has a voltage level of VB−2Vf. Therefore, the first capacitor 36 is not charged, and the second capacitor 37 is charged via the diodes 33 and 34. Electric charge Q2 of the second capacitor 37 is obtained by:

$$Q2 = C2(VB - 2Vf)$$

when the capacity is C2.

When the output of the oscillation circuit 24 is reversed to "H" level under this condition, the output of the inverter circuit 30 is turned to "L" level (=VS), and the output of the inverter circuit 32 is turned to "H" level (=VB). As a result, the first capacitor 36 is charged from the power source +B via the diode 33, and a charge Q1 to be charged to the first capacitor 36 is obtained by:

$$Q1 = C1(VB - Vf)$$

when the capacity is C1. Also, low potential side of the second capacitor 37 is increased to the level of the supply voltage VB while maintaining the electric charge Q2.

When the output of the oscillation circuit 24 is reversed to "L" level from this condition, and when the output of the inverter circuit 30 is turned to "H" level (=VB) and the output of the inverter circuit 32 is turned to "L" level (=VS), low potential side of the first capacitor 36 is increased to the supply voltage VB while maintaining the electric charge Q1. As a result, voltage level of the high potential side is increased to total sum of the voltage corresponding to the supply voltage VB and the electric charge Q1. In this case, the high potential side of the second capacitor 37 is turned to the voltage level of VB−2Vf, and electric charge is shifted from the first capacitor 36 to the second capacitor 37. As a result, the electric charge Q2 to be charged on the second capacitor 37 is increased by an amount of the electric charge thus shifted.

Thereafter, the above operation is repeatedly performed in synchronization with the oscillation output of the oscillation circuit 24. Charge pumping operation is performed, in which electric charge of the first capacitor 36 charged from the power source +B is shifted in turn to the second capacitor 37. When the capacity C1 and the capacity C2 of the capacitors 36 and 37 are equal to each other, the potential at the output terminal Qout is increased to about the level of (VB+1.5 VT−Vf).

In short, according to the arrangement of the present embodiment, when the supply voltage VB is increased, the reference voltage VS is also increased, and the relationship between the supply voltage VB and the reference voltage VS is always maintained at constant level. As a result, maximum value of the voltage applied to the first capacitor 36 and the second capacitor 37 is fixed at constant level. Specifically, the voltage applied on the first capacitor 36 and the second capacitor 37 is not increased with the increase of the supply voltage VB as in the past. Therefore, this eliminates adverse effect on service life of the first capacitor 36 and the second capacitor 37.

Incidentally, in case the charge pumping circuit 26 is designed as a one-chip IC, the first capacitor 36 and the second capacitor 37 are formed as thin-film capacitors. In this case, service life of semiconductor oxide film (generally, silicon oxide film) of the thin-film capacitor depends on the film thickness and the voltage in use (applied voltage). It is known that a model of effective oxide film service life tBD is given by the following equation (1) (J. C. Lee et al., IEEE Trans. Electron Devices, 35, 1998, p.2268):

$$tBD = \tau 0 \cdot exp(G \cdot Xeff/Vox) \tag{1}$$

where

τ0 and G: Constants for wafer process

Xeff: Effective oxide film thickness

Vox: Voltage in use (applied voltage)

Figure 17:
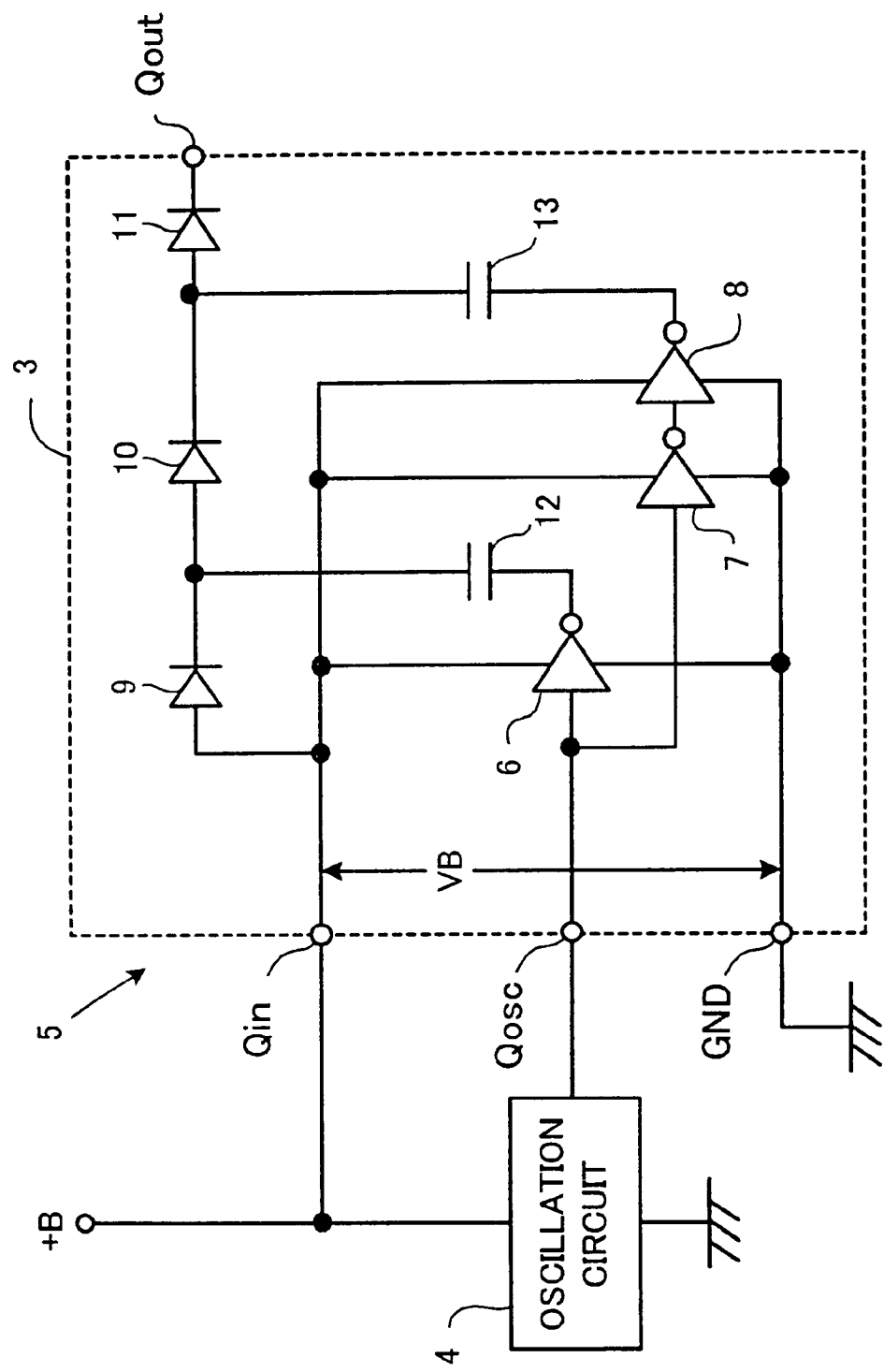
FIG. 17 is a block diagram of a conventional type charge pumping circuit (corresponding to FIG. 1)
Figure 18:
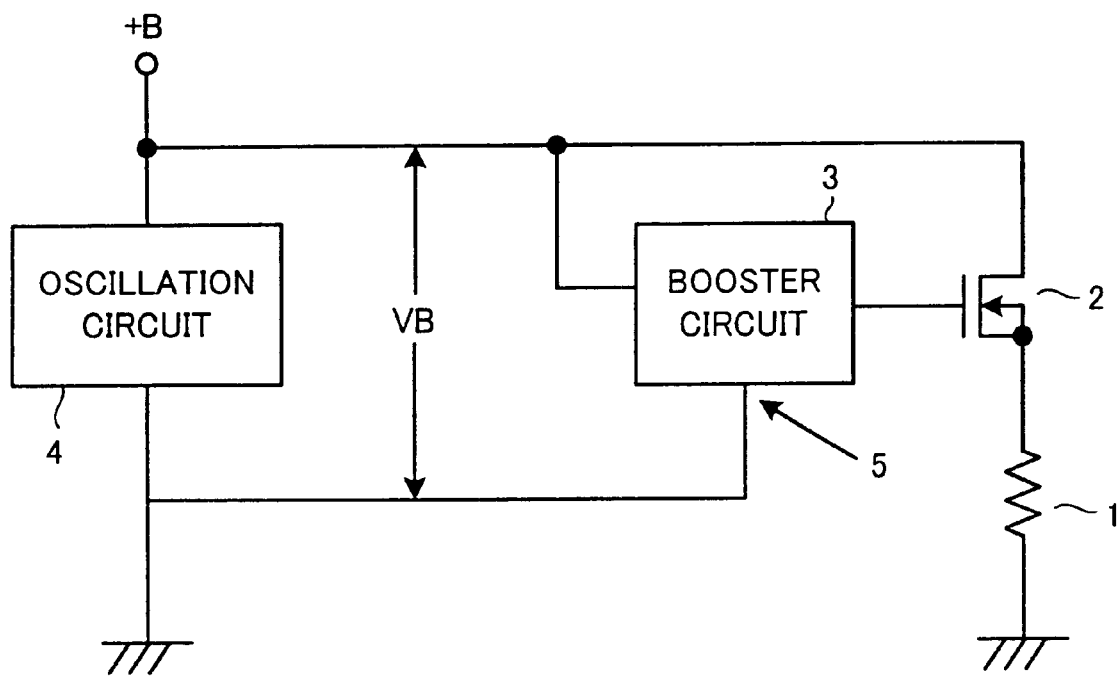
FIG. 18 is a block diagram of a conventional type load drive circuit (corresponding to FIG. 2).

Here, if it is supposed that the voltage in use (voltage applied on capacitor) in the conventional circuit configuration as shown in FIG. 17 is Vox1, then the service life of the oxide film tBD1 is given by the following equation (2):

$$tBD1 = \tau 0 \cdot exp(G \cdot Xeff/Vox1) \tag{2}$$

Also, service life of the oxide film tBD2 when the voltage in use is 1/n of Vox1 as given above is expressed by the equation (3):

$$tBD2 = \tau 0 \cdot exp(n \cdot G \cdot Xeff/Vox1) \tag{3}$$

Namely, the applied voltage Vox in the equation (1) is a multiplier of exponential function. Thus, the service life of the oxide film tBD is exponentially increased in response to the decrease of the applied voltage Vox. Therefore, according to the present embodiment, in which the applied voltage on the first capacitor 36 and the second capacitor 37 is lower than in the conventional circuit, it is possible to extend the service life of the first capacitor 36 and the second capacitor 37 exponentially. This contributes to the improvement of reliability in the service life of the capacitors 36 and 37.

On the other hand, when the booster circuit 3 is operated between the supply voltage VB and the ground potential level as in the conventional circuit shown in FIG. 17, output current of the booster circuit 3 is changed due to the variation of the supply voltage VB. If it is wanted to obtain an ability to satisfy the required specification, it is necessary that the supply voltage VB satisfies this requirement even when it is decreased to the lowest operating voltage. For this reason, when the supply voltage VB is at normal level, the circuit must be inevitably designed in such circuit configuration that output current is consumed uselessly.

In contrast, as in the charge pumping circuit 26 of the present embodiment, when the booster circuit 23 is designed in such manner that it is operated between the supply voltage VB and the reference voltage VS, which is lower by a fixed voltage VT than the supply voltage VB, the operating condition of the booster circuit 23 is maintained at a constant level regardless of the variation of the supply voltage VB. Accordingly, if boosting ability is determined so that the reference voltage VS is in stable condition to maintain a certain fixed relationship to the supply voltage VB, no useless output current flows any more even when the supply voltage VB is increased. As a result, the current consumption can be reduced.

Figure 5:
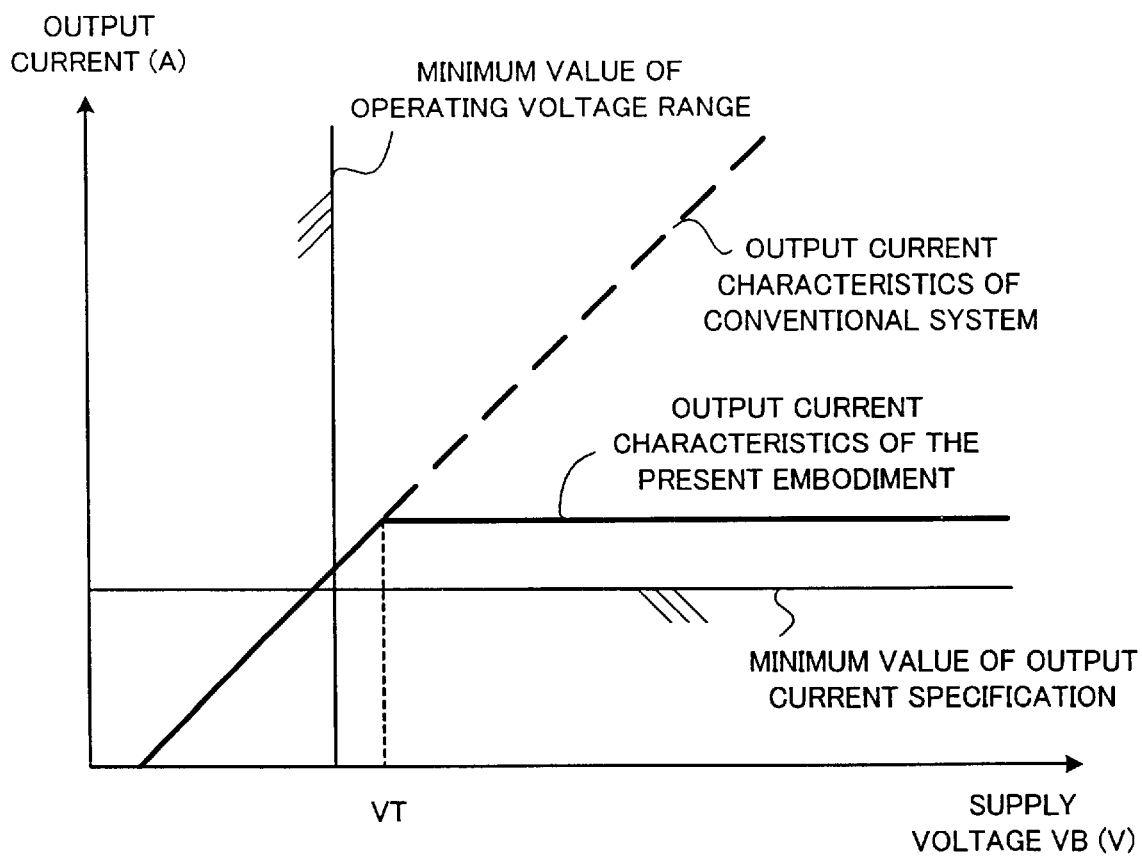
FIG. 5 is a characteristic diagram for explaining operation of the first embodiment of the invention.

Incidentally, FIG. 5 shows the relationship of output current characteristics in the present embodiment and output current characteristics in the conventional circuit. As shown in FIG. 5, the output current is linearly increased with the increase of the supply voltage VB as shown by dotted line in the conventional circuit. According to the present embodiment, the output current is stabilized at a fixed value at the moment when the constant voltage VT is stabilized as shown by solid line (i.e. at the moment when the supply voltage VB is turned to a level higher than the voltage VT; the moment when the reference voltage VS reaches a stable condition to maintain a constant relationship to the supply voltage VB). Therefore, when the minimum value of output current specification and minimum value of operating voltage range are given as shown in the figure, and if the level of the voltage VT is set at such level that the output current is stabilized at a certain value when the minimum value of the output current specification is reached, it is possible to satisfy the output current specification at all times while decreasing the consumption of electric current.

Because the output current is decreased and consumption current is also decreased, sudden current change on power line connected to the power source +B or on the output line connected to the load 21 can be suppressed. Thus, secondary effect to reduce radio noise due to current change can also be attained.

It is designed that the reference voltage VS is outputted via the voltage follower 29, which comprises an operational amplifier, and the reference voltage VS is very unlikely to change even when load current supplied from the power source +B is changed. As a result, it is possible to prevent unexpected change of the maximum value of the voltage applied on the first capacitor 36 and the second capacitor 37. Moreover, when the voltage follower 29 comprising operational amplifier is used, stable operation with very few errors can be expected.

In a load drive circuit using the charge pumping circuit 26 to obtain the above effect, the load 21 is driven by on-off control of N channel type MOS transistor 22, which has advantageous features such as low ON resistance, high load current can be supplied, and the reliability on service life can be improved.

(2nd Embodiment)

Figure 6:
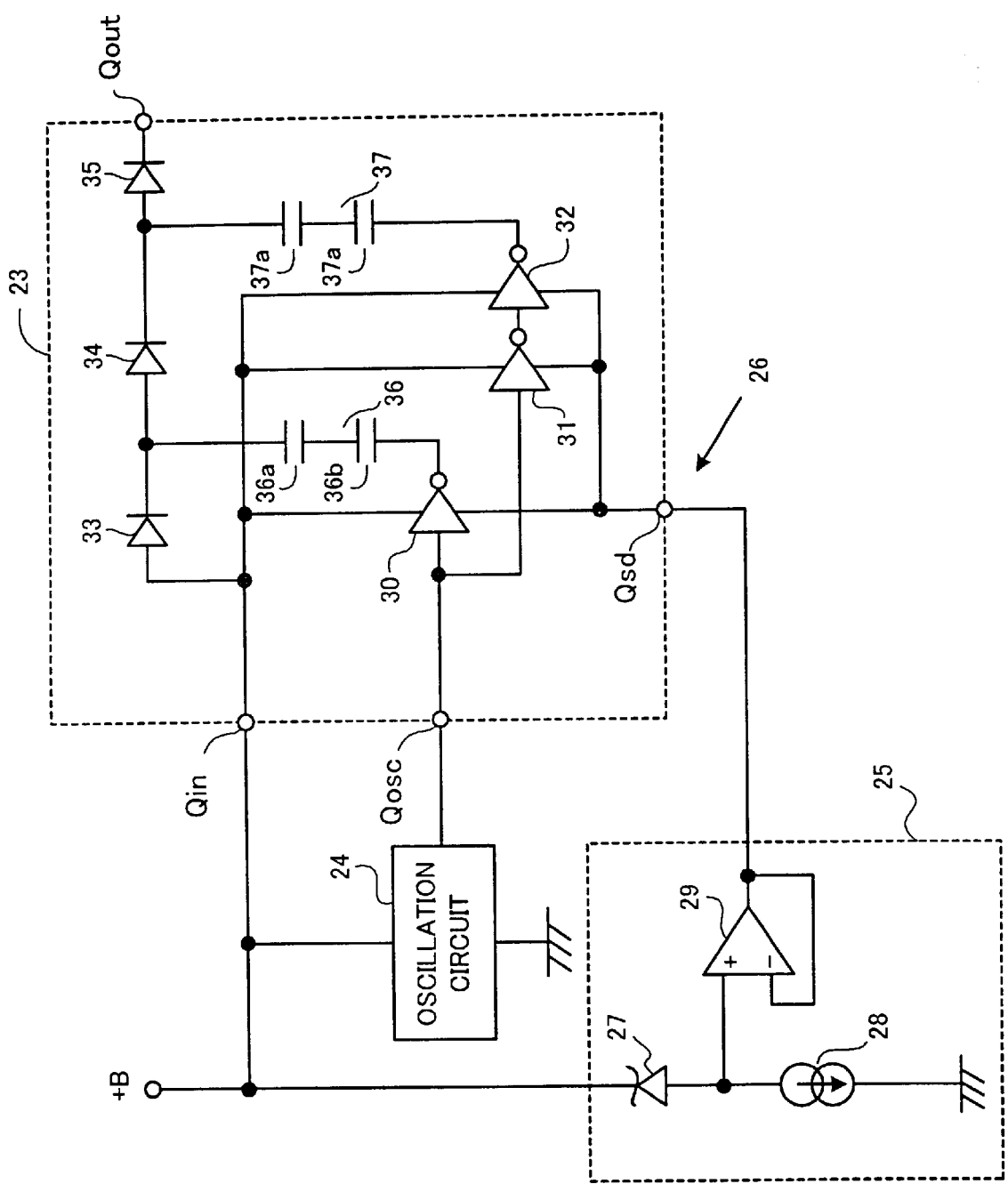
FIG. 6 is a block diagram corresponding to FIG. 1 of a second embodiment of the present invention.

FIG. 6 represents a second embodiment of the present invention. In the following, description will be given only on the features of this embodiment different from the those of the first embodiment.

This second embodiment is characterized in that each of the first capacitor 36 and the second capacitor 37 comprises two unit capacitors 36a and 36b and 37a and 37b respectively and these unit capacitors are connected in series. Each of the first capacitor 36 and the second capacitor 37 may be designed by serially connecting a plurality of unit capacitors.

According to the features of the present embodiment, the area required for providing the first capacitor 36 and the second capacitor 37 is increased. However, even when short-circuiting failure occurs in one of the unit capacitors 36a, 36b, 37a or 37b, boosting function of the first capacitor 36 and the second capacitor 37 can be maintained, and this contributes to the improvement of operating reliability. When short-circuiting failure occurs in one of the unit capacitors 36a, 36b, 37a, or 37b, boosting ability by the booster circuit 23 is decreased by about 25%, but there is no possibility to lead to lethal functional failure. Therefore, this is a circuit configuration optimal for the use in a system, which requires high reliability.

(3rd Embodiment)

Figure 7:
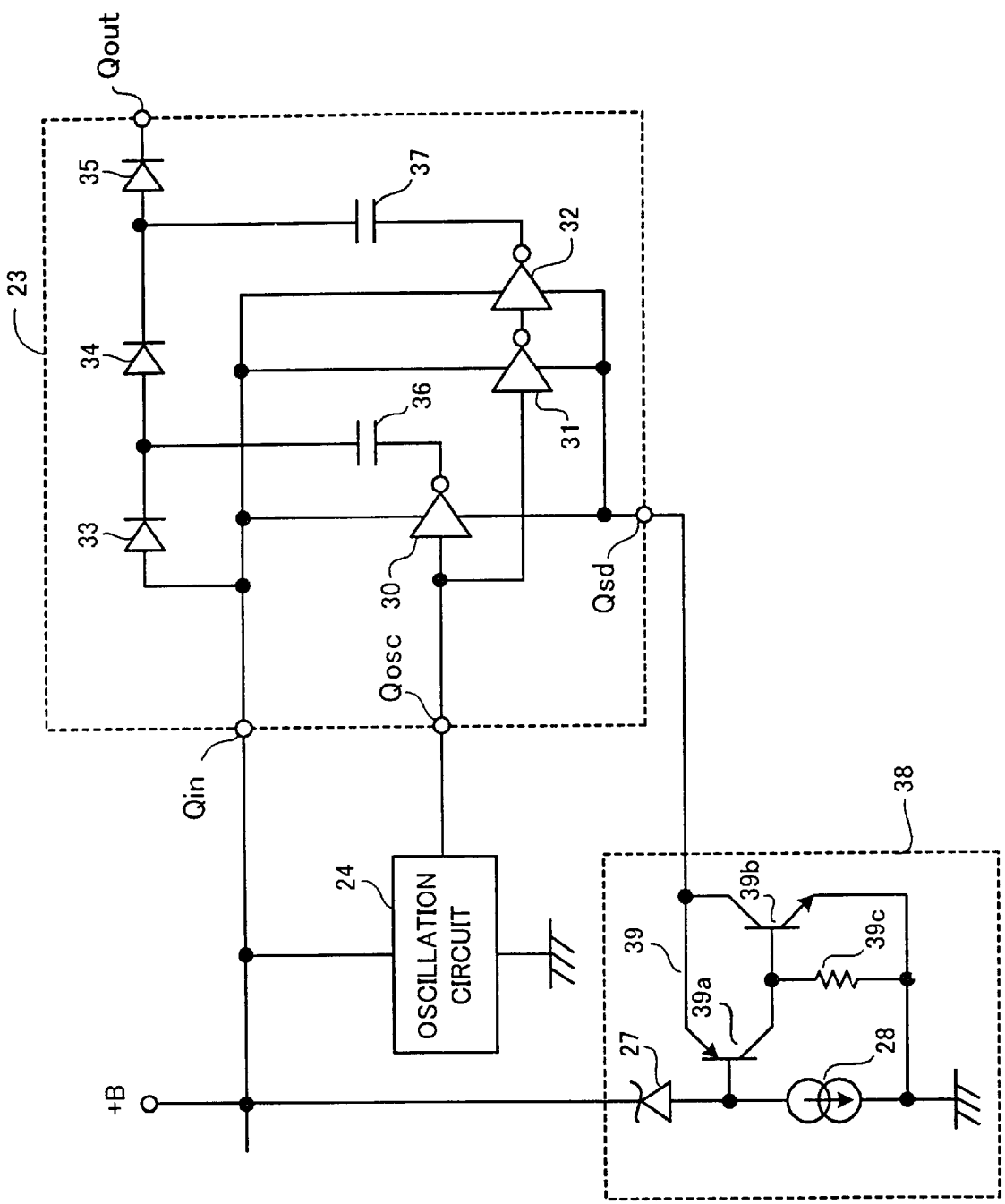
FIG. 7 is a block diagram corresponding to FIG. 1 of a third embodiment of the present invention.

FIG. 7 shows a third embodiment of the present invention. In the following, description will be given only on the features of the third embodiment different from those of the first embodiment.

In the third embodiment, a current amplifier circuit 38 comprising a Darlington transistor circuit is provided instead of the voltage follower 29 (FIG. 2) in the power reference constant voltage generation circuit 25. In this case, the current amplifier circuit 38 comprises a Darlington transistor circuit 39, which contains a pnp type transistor 39a and an npn type transistor 39b instead of the voltage follower 29, and a resistance 39c is connected between base and emitter of the subsequent stage transistor 39b. Also, the base of the preceding stage transistor 39a is connected to anode of the Zener diode 27, and emitter of the subsequent stage transistor 39b is connected to the ground terminal. Further, collector of the transistor 39b (emitter of the transistor 39a) is connected to the reference voltage terminal Qsd of the booster circuit 23.

In the present embodiment with the above arrangement, almost the same effect as the first embodiment can be obtained. In particular, according to the present embodiment, the current amplifier circuit 38 is designed in simple arrangement using the Darlington transistor circuit 39. This leads to such advantage that the circuit can be designed more simply compared with the first embodiment using the voltage follower 29.

(Other Embodiments)

The present invention is not limited to the embodiments as described above, and variations and extensions as given below can be made.

As the examples of the inverter circuits 30–32 in each of the embodiments, the examples as shown in FIG. 3 and FIG. 4 have been described, while the inverter circuits as shown in FIG. 8–FIG. 16 may be used. With the use of the inverter circuits having diverse circuit configurations, it is possible to improve the degree of freedom in circuit design.

Figure 8:
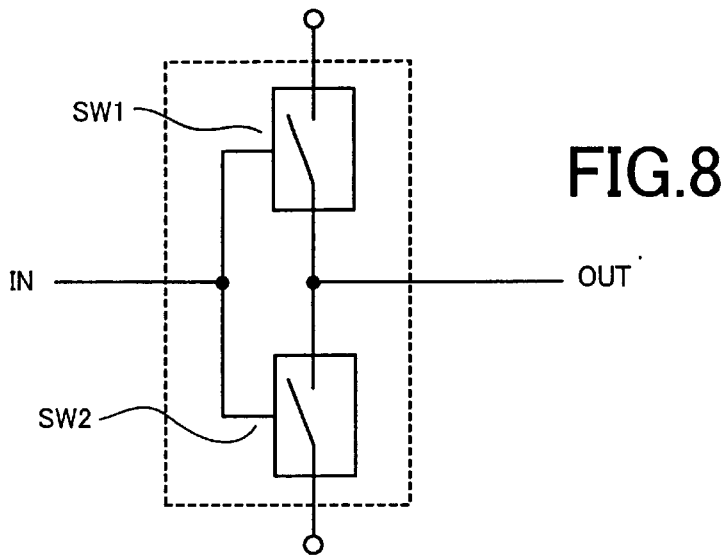
FIG. 8 is an equivalent circuit diagram of a first variation of the inverter circuit in each of the above embodiments.
Figure 9:
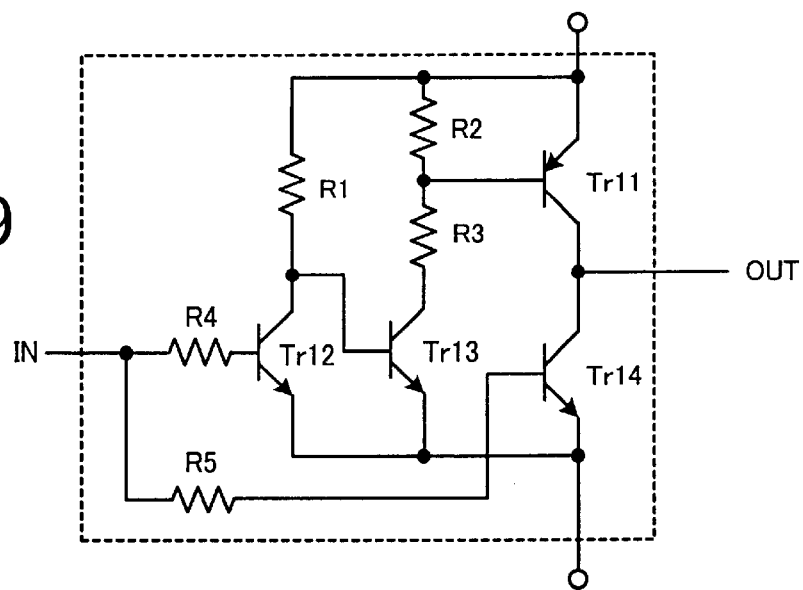
FIG. 9 is a concrete circuit diagram No. 1 of the inverter circuit.
Figure 10:
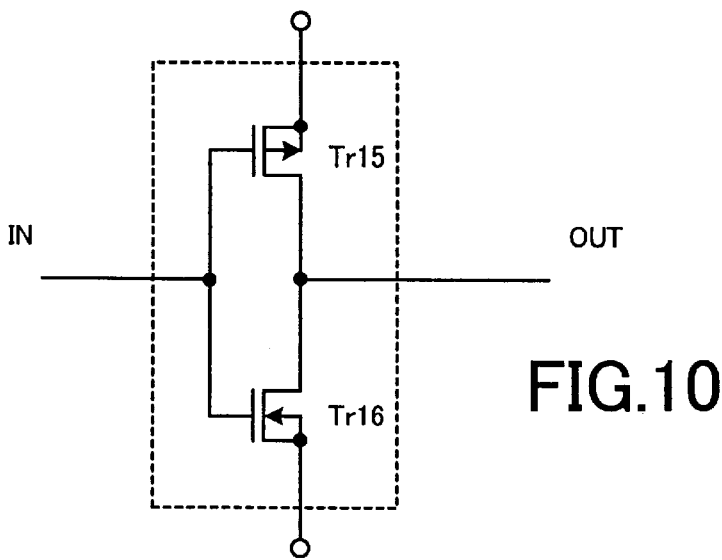
FIG. 10 is a concrete circuit diagram No.2 of the inverter circuit.

FIG. 8 shows an equivalent circuit of an inverter circuit using switching elements SW1 and SW2, which comprise semiconductor switches for outflow and inflow of the electric current. FIG. 9 shows a concrete example of a circuit, which uses a pnp type bipolar transistor Tr11, npn type bipolar transistors Tr12–Tr14 and resistances R1–R5 in the equivalent circuit of FIG. 8. FIG. 10 shows a CMOS inverter, which makes up the equivalent circuit by the use of a complementary MOS transistors Tr15 and Tr16.

Figure 11:
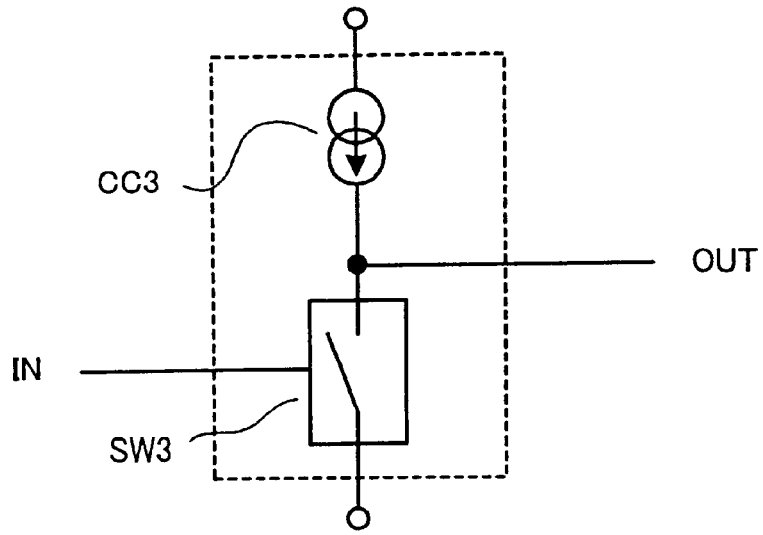
FIG. 11 is an equivalent circuit diagram of a second variation of the inverter circuit in each of the above embodiments.
Figure 12:
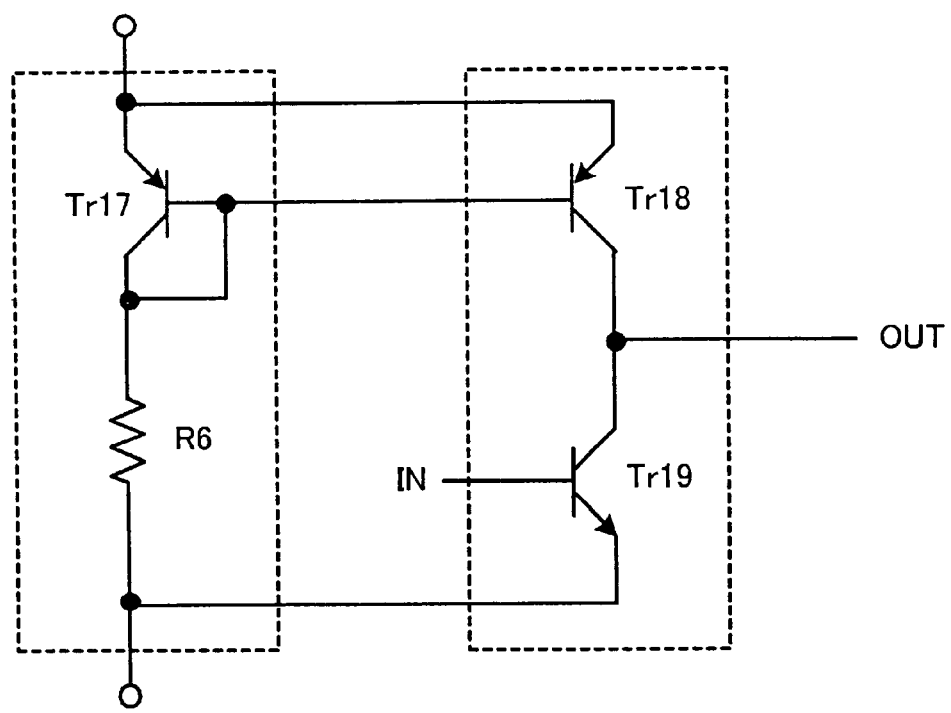
FIG. 12 is a concrete circuit diagram No. 1; of the inverter circuit.
Figure 13:
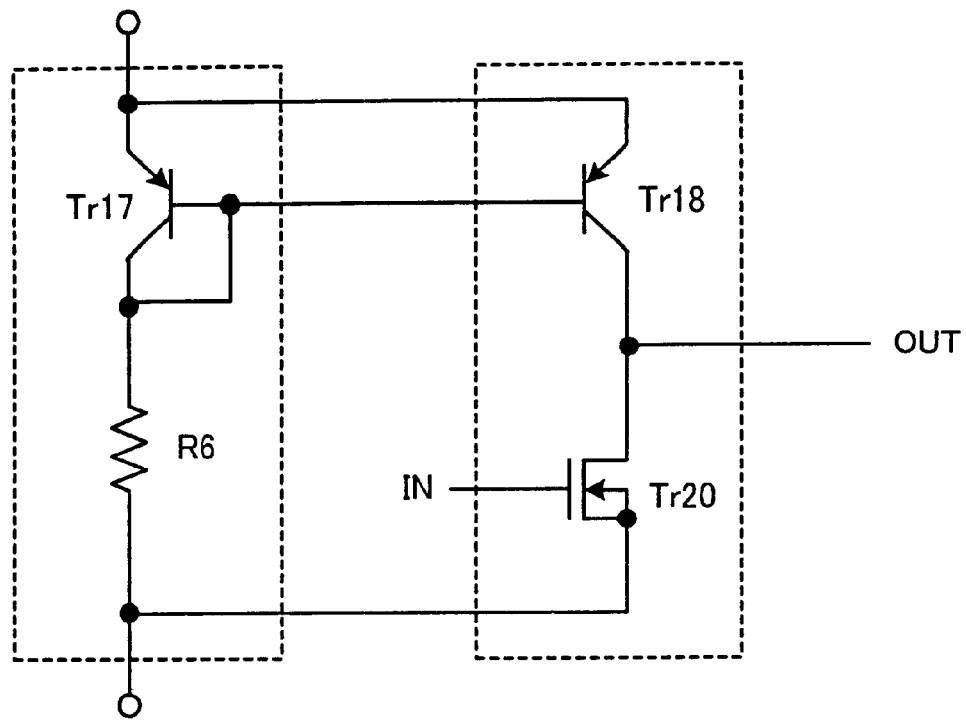
FIG. 13 is a concrete circuit diagram No.2 of the inverter circuit.

FIG. 11 shows an equivalent circuit of an inverter circuit, which uses a constant current source CC3 for outflow of electric current and uses a switching element SW3 comprising a semiconductor switch for inflow of electric current. FIG. 12 shows a concrete circuit example, which makes up an equivalent circuit of FIG. 11 by the use of pnp type bipolar transistors Tr17 and Tr18, an npn type bipolar transistor Tr19, and a resistance R6. FIG. 13 shows a concrete circuit example, which is the same as the circuit of FIG. 12 except that the bipolar transistor Tr19 is replaced by an N channel MOS transistor Tr20.

Figure 14:
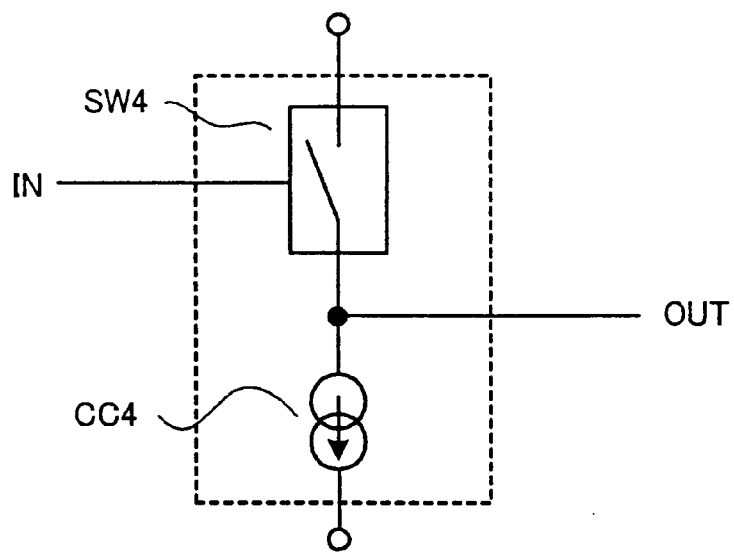
FIG. 14 is an equivalent circuit diagram showing a third variation of the inverter circuit in each of the above embodiments.
Figure 15:
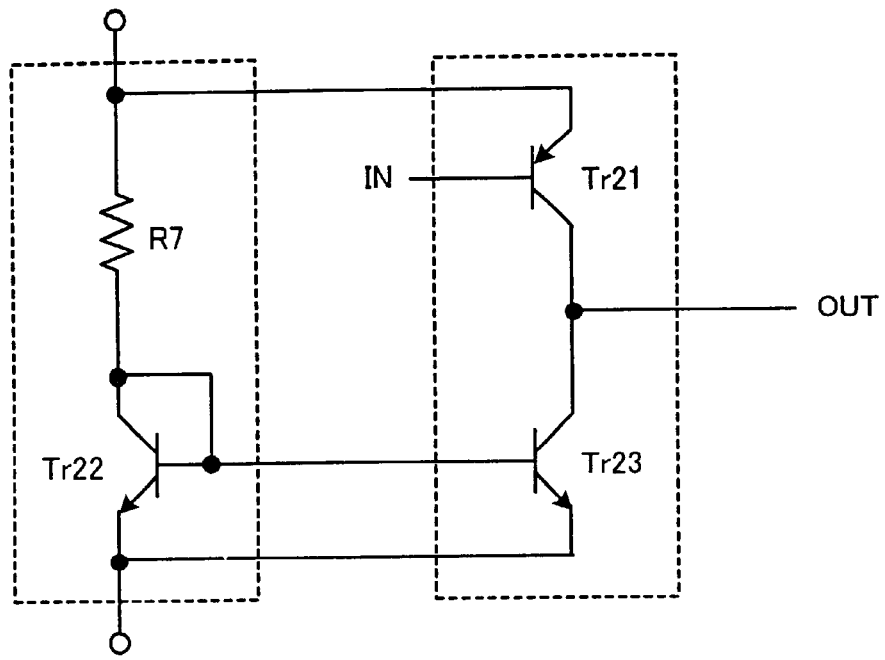
FIG. 15 is a concrete circuit diagram No. 1 of the inverter circuit.
Figure 16:
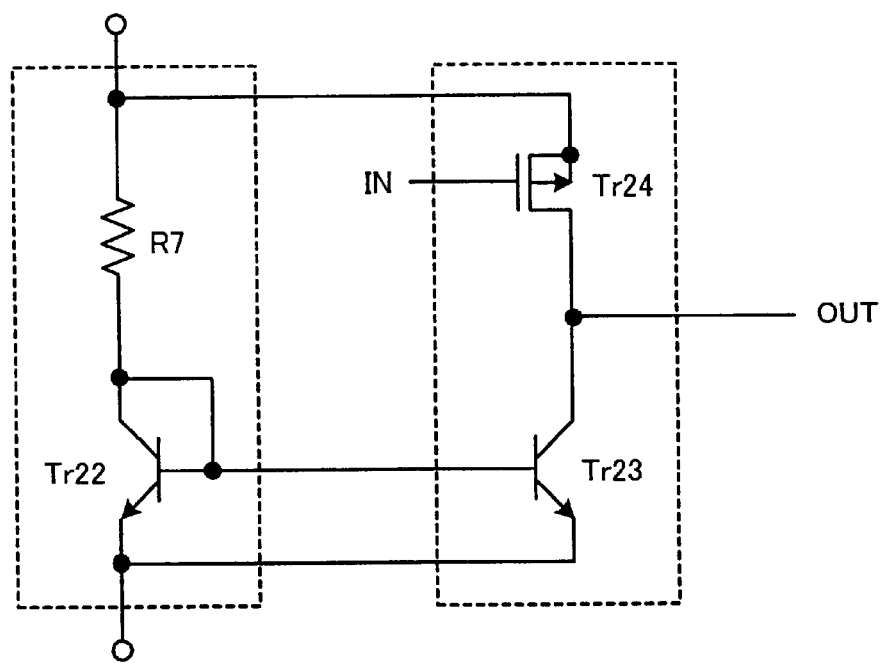
FIG. 16 is a concrete circuit diagram No.2 of the inverter circuit.

FIG. 14 shows an equivalent of an inverter circuit, which uses a switching element SW4 comprising a semiconductor switch for outflow of electric current and uses a constant current source CC4 for inflow of the electric current. FIG. 15 shows a concrete circuit example, which makes up the equivalent circuit of FIG. 14 by using a pnp type bipolar transistor Tr21, npn type bipolar transistors Tr22 and Tr23 and a resistance R7. FIG. 16 shows a concrete circuit example, which is the same as the circuit of FIG. 14 except that the bipolar transistor Tr21 is replaced by a P channel MOS transistor Tr24.

What is claimed is:

1. A charge pumping circuit provided with a booster circuit for boosting and comprising a first capacitor and a second capacitor each with a terminal thereof connected to a power source, charging operation is performed intermittently from said power source to the first capacitor, an electric charge charged on said first capacitor being shifted to said second capacitor via reverse-blocking means to carry out boosting of supply voltage, said charge pumping circuit further comprising:

a constant voltage generation circuit for generating reference voltage maintained at a level lower by a fixed voltage than said supply voltage; and said booster circuit intermittently performs charging operation of said first capacitor by periodically changing potential of the other terminal for said first capacitor between said supply voltage level and said reference voltage level, and electric charge charged on the first capacitor is shifted to said second capacitor via said reverse-blocking means by changing potential of the other terminal of said second capacitor to anti-phase with respect to said first capacitor between said supply voltage level and said reference voltage level.

2. The charge pumping circuit according to claim 1, wherein said constant voltage generation circuit outputs said reference voltage via a current amplifier circuit of high input impedance.

3. The charge pumping circuit according to claim 2, wherein said current amplifier circuit comprises a voltage follower using an operational amplifier.

4. The charge pumping circuit according to claim 2, wherein said current amplifier circuit comprises a Darlington transistor circuit.

5. The charge pumping circuit according to claim 1, wherein said first capacitor and said second capacitor each comprises a plurality of unit capacitors connected in series with each other.

6. The charge pumping circuit according to claim 1, wherein said booster circuit comprises:

a first switching circuit provided for performing periodic reverse operation in synchronization with oscillation output of said oscillation circuit and alternately changing output voltage between said supply voltage and said reference voltage in response to the reverse operation;

a second switching circuit provided for performing periodic reverse operation at a phase by 180° different from the phase of the first switching circuit and for alternately changing output voltage between said reference voltage and said supply voltage in response to the reverse operation;

a first rectifying device for supplying charging current to said first capacitor from said power source during period when output voltage of said first switching circuit is changed to said reference voltage; and a second rectifying device is provided as said reverse-blocking means for shifting the electric charge charged on said first capacitor to said second capacitor during the period when output voltage of said second switching circuit is changed to said reference voltage.

7. The charge pumping circuit according to claim 6, wherein said first switching circuit comprises an inverter circuit connected to an input terminal to receive oscillation output of said oscillation circuit; and said second switching circuit comprises an inverter circuit connected in such manner that output voltage with a phase by 180° different from the phase of said first switching circuit is generated.

8. A load drive circuit, using a charge pumping circuit, said charge pumping circuit being provided with a booster circuit for boosting and comprising a first capacitor and a second capacitor each with a terminal thereof connected to a power source, charging operation is performed intermittently from said power source to the first capacitor, an electric charge charged on said first capacitor being shifted to said second capacitor via reverse-blocking means to carry out boosting of supply voltage, said charge pumping circuit further comprising:

a constant voltage generation circuit for generating reference voltage maintained at a level lower by a fixed voltage than said supply voltage;

said booster circuit intermittently performs charging operation of said first capacitor by periodically changing potential of the other terminal for said first capacitor between said supply voltage level and said reference voltage level, and electric charge charged on the first capacitor is shifted to said second capacitor via said reverse-blocking means by changing potential of the other terminal of said second capacitor to anti-phase to said first capacitor between said supply voltage level and said reference voltage level; and there is further provided:

an N channel MOS transistor for receiving voltage output of said charge pumping circuit as a gate signal; and said N channel MOS transistor is used as a high side switch with a drain thereof connected to a power source terminal and a source thereof connected to the load to be controlled.

* * * * *